United States Patent
Masser (10) Patent No.: US 9,274,922 B2
(45) Date of Patent: Mar. 1, 2016

(54) LOW-LEVEL CHECKING OF CONTEXT-DEPENDENT EXPECTED RESULTS

(71) Applicant: International Business Machines Corporation, Armonk, NY (US)

(72) Inventor: Joel L. Masser, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 273 days.

(21) Appl. No.: 13/860,104

(22) Filed: Apr. 10, 2013

(65) Prior Publication Data
US 2014/0310558 A1    Oct. 16, 2014

(51) Int. Cl.
*G06F 11/00*    (2006.01)
*G06F 11/36*    (2006.01)
*G06F 11/263*    (2006.01)
*G06F 11/26*    (2006.01)

(52) U.S. Cl.
CPC .............. *G06F 11/36* (2013.01); *G06F 11/261* (2013.01); *G06F 11/263* (2013.01)

(58) Field of Classification Search
CPC .. G06F 11/261; G06F 11/263; G06F 11/5022
USPC .......................................................... 714/33
See application file for complete search history.

(56) References Cited

U.S. PATENT DOCUMENTS

| | | | | |
|---|---|---|---|---|
| 4,914,659 | A * | 4/1990 | Erickson | 714/38.11 |
| 5,390,325 | A * | 2/1995 | Miller | 714/38.14 |
| 5,652,835 | A * | 7/1997 | Miller | 714/38.14 |
| 5,845,065 | A * | 12/1998 | Conte et al. | 726/31 |
| 6,477,666 | B1 * | 11/2002 | Sanchez et al. | 714/41 |
| 6,480,800 | B1 * | 11/2002 | Molyneaux et al. | 702/120 |
| 6,556,832 | B1 * | 4/2003 | Soliman | 455/456.5 |
| 6,769,114 | B2 * | 7/2004 | Leung | 717/124 |

(Continued)

FOREIGN PATENT DOCUMENTS

| | | |
|---|---|---|
| CN | 102339647 A | 2/2012 |
| CN | 202142106 | 2/2012 |
| WO | WO 2010082946 A1 | 7/2010 |

OTHER PUBLICATIONS

Hangal, Sudheendra, and Monica S. Lam. "Tracking down software bugs using automatic anomaly detection." In Proceedings of the 24th international conference on Software engineering, pp. 291-301. ACM, 2002.

(Continued)

*Primary Examiner* — Amine Riad
(74) *Attorney, Agent, or Firm* — Patricia B. Feighan; William Kinnaman (57) ABSTRACT

A processor-implemented method for diagnostic testing using an expected result parameter is provided. The processor-implemented method may include establishing a known system environment associated with a function under test and setting the expected result parameter corresponding to the function under test and the known system environment. A call is issued by the processor to execute the function under test. Before returning to the caller, the function under test compares an expected result value to an actual result value. The function under test determines an error based on the actual result value being different from the expected result value and performs a low-level diagnostic based on the determined error. Then the processor receives a return value from the function under test based on the issued call.

14 Claims, 3 Drawing Sheets

(56) References Cited

U.S. PATENT DOCUMENTS

| | | | |
|---|---|---|---|
| 6,895,578 B1* | 5/2005 | Kolawa et al. | 717/130 |
| 6,968,285 B1* | 11/2005 | Hamid | 702/119 |
| 7,114,164 B2* | 9/2006 | Smith et al. | 719/318 |
| 7,587,636 B2* | 9/2009 | Tillmann et al. | 714/33 |
| 8,892,952 B2 | 11/2014 | Alexander et al. | |
| 8,930,761 B2 | 1/2015 | Masser et al. | |
| 2002/0066077 A1* | 5/2002 | Leung | 717/126 |
| 2002/0124205 A1* | 9/2002 | Grey et al. | 714/33 |
| 2004/0243882 A1* | 12/2004 | Zhou | 714/38 |
| 2006/0271825 A1* | 11/2006 | Keaffaber et al. | 714/38 |
| 2007/0168728 A1* | 7/2007 | Blouin et al. | 714/25 |
| 2007/0168766 A1 | 7/2007 | Le et al. | |
| 2008/0168339 A1 | 7/2008 | Hudson et al. | |
| 2010/0131805 A1 | 5/2010 | Katsuragi | |
| 2012/0005532 A1 | 1/2012 | Li et al. | |
| 2012/0036418 A1 | 2/2012 | Morino et al. | |
| 2012/0084754 A1 | 4/2012 | Ziegler et al. | |

OTHER PUBLICATIONS

Pouillot, Régis, et al ""TAGS", a program for the evaluation of test accuracy in the absence of a gold standard." Preventive veterinary medicine 53, No. 1 (2002): 67-81.

Ayalew, Yirsaw et al; "Detecting errors in spreadsheets." arXiv preprint arXiv:0805.1740 (2008).

http://junit.sourceforge.net/doc/faq/faq.htm#overview_1. Feb. 26, 2013.

http://www.jguru.com/faq/view.jsp?EID=25537. Feb. 26, 2013.

* cited by examiner

LOW-LEVEL CHECKING OF CONTEXT-DEPENDENT EXPECTED RESULTS

FIELD OF THE INVENTION

The present invention relates generally to the field of software diagnostics, and more particularly to diagnostics within nested software subroutines.

BACKGROUND

Computer programming languages have been developing rapidly over the years. Many programs today not only include functions or routines, but also include nested functions or subroutines (i.e. sub-functions). In computer programming, a subroutine is a sequence of program instructions that perform a specific task, packaged as a unit. This unit can then be used in programs wherever that particular task should be performed. Subroutines may be defined within programs, or separately in libraries that can be used by multiple programs. In different programming languages a subroutine may be called a procedure, a function, a routine, a method, or a subprogram. The generic term callable unit is sometimes used.

A subroutine is similar to a computer program that is used as one step in a larger program or another subprogram. A subroutine may be coded so that it can be started (i.e. called) several times from several places during one execution of the program, including from other subroutines, and then branch back (i.e. return) to the next instruction after the call once the subroutine's task is done. Subroutines may reduce the cost of developing and maintaining a large program, while increasing its quality and reliability.

However, error detection in subroutines may be very difficult during software or hardware test execution or customer problem recreation. Usually, by the time an error is detected, storage areas with pertinent information for diagnosis of the error may be overwritten, causing loss of pertinent information. Therefore, it may be advantageous, among other things, to provide earlier and better problem documentation.

SUMMARY

According to at least one embodiment of the present invention, a processor-implemented method for diagnostic testing using an expected result parameter is provided. The processor-implemented method may include establishing a known system environment associated with a function under test and setting the expected result parameter corresponding to the function under test and the known system environment. A call is issued by the processor to execute the function under test. Before returning to the caller, the function under test compares an expected result value to an actual result value. The function under test determines an error based on the actual result value being different from the expected result value and performs a low-level diagnostic based on the determined error. Then the processor receives a return value from the function under test based on the issued call.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates generally to diagnostics within a program, and more particularly, to the low-level checking of context-dependent expected results. The following described exemplary embodiments provide a system, method and program product to enable earlier, better problem documentation.

When initial diagnosis of a software problem fails because of a lack of information, it may be difficult to collect adequate documentation even if the problem is recreated. This is particularly true in the case of nested software calls (subroutines). As previously described, a subroutine may be written so that it expects to obtain one or more data values from the calling program (i.e. its parameters or formal parameters). The calling program provides actual values for these parameters, called arguments. The subroutine may also return a computed value to its caller (i.e. its return value).

Additionally, a call stack is a stack data structure that stores information about the active subroutines of a computer program. This kind of stack may also be known as an execution stack, control stack, run-time stack, or machine stack. A call stack is used for several related purposes, but the main reason for having one is to keep track of the point to which each active subroutine should return control when it finishes executing. An active subroutine is one that has been called but is yet to complete execution after which control should be handed back to the point of call. Such activations of subroutines may be nested to any level (recursive as a special case), hence the stack structure. If, for example, a subroutine ABC calls a subroutine DEF from four different places, DEF must know where to return when its execution completes. To accomplish this, the address following the call instruction (i.e. the return address) is pushed onto the call stack with each call.

Since the call stack is organized as a stack, the caller pushes the return address onto the stack, and the called subroutine, when it finishes, pops the return address off the call stack and transfers control to that address. If a called subroutine calls on to yet another subroutine, it will push another return address onto the call stack, and so on, with the information stacking up and unstacking as dictated by the program. If the pushing consumes all of the space allocated for the call stack, an error called a stack overflow occurs, generally causing the program to crash. There is usually one call stack associated with a running task of a process.

However, as previously described, there may be problems performing error detection within nested subroutines or nested software calls. For example, an error may occur at the bottom of the call stack, but may not be detected until the stack is cleared and control is returned to the end user. Much of the transient data that was present at the time of the error may be lost. For example, a test case may check the existence of a data set and if it is present, delete it. If the deletion fails because the data set is not found, the test case detects an error that is not detectable at a lower level in the call stack because "data set not found" is a common occurrence. It is only because the test case knows the data set should be there that it can detect an error either in the function that found the data set or in the delete function itself. As such, by the time the test case tries to collect problem documentation the state of the system has changed too much for successful diagnosis.

As such, there exists a need for improving serviceability by providing a test case or other high-level data processing program the ability to specify expected or allowable results to a called function. In one embodiment, the called function (i.e. the function under test) may detect an error earlier and collect problem documentation closer to the problem than the high level program can upon return. Therefore, context information (i.e. expected result parameter) is passed to called functions, so that they can more effectively detect errors. The method operates by using expected results that are determined dynamically and specified at run-time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product to generate an optional parameter (i.e., "expected result parameter") and this optional parameter is added to the invocation statements of a set of functions. Therefore, results checking logic is added to the functions and, if not already present, documentation collection logic is added to the functions. The present embodiment is different from the current state of the art method since the expected results parameters are passed through multiple levels of nesting and provide finer granularity than other methods. The expected result parameter may include a name of the function under test, an expected result value to be checked against the actual result value, a type of comparison, a set of conditions that are to be considered the error, a set of conditions wherein anything not in the set is to be considered the error, and an action to be taken when the error occurs. Additionally, checking of processing results is pushed to a lower level than in conventional software implementations. As such, the present embodiment allows for dynamic variation of error detection and handling based on context or environment at the time of the call. Furthermore, a high-level program is able to communicate additional information to a lower level module so that errors can be detected closer to their occurrence and as such, perform a low-level diagnostic based on the determined error.

Figure 1:
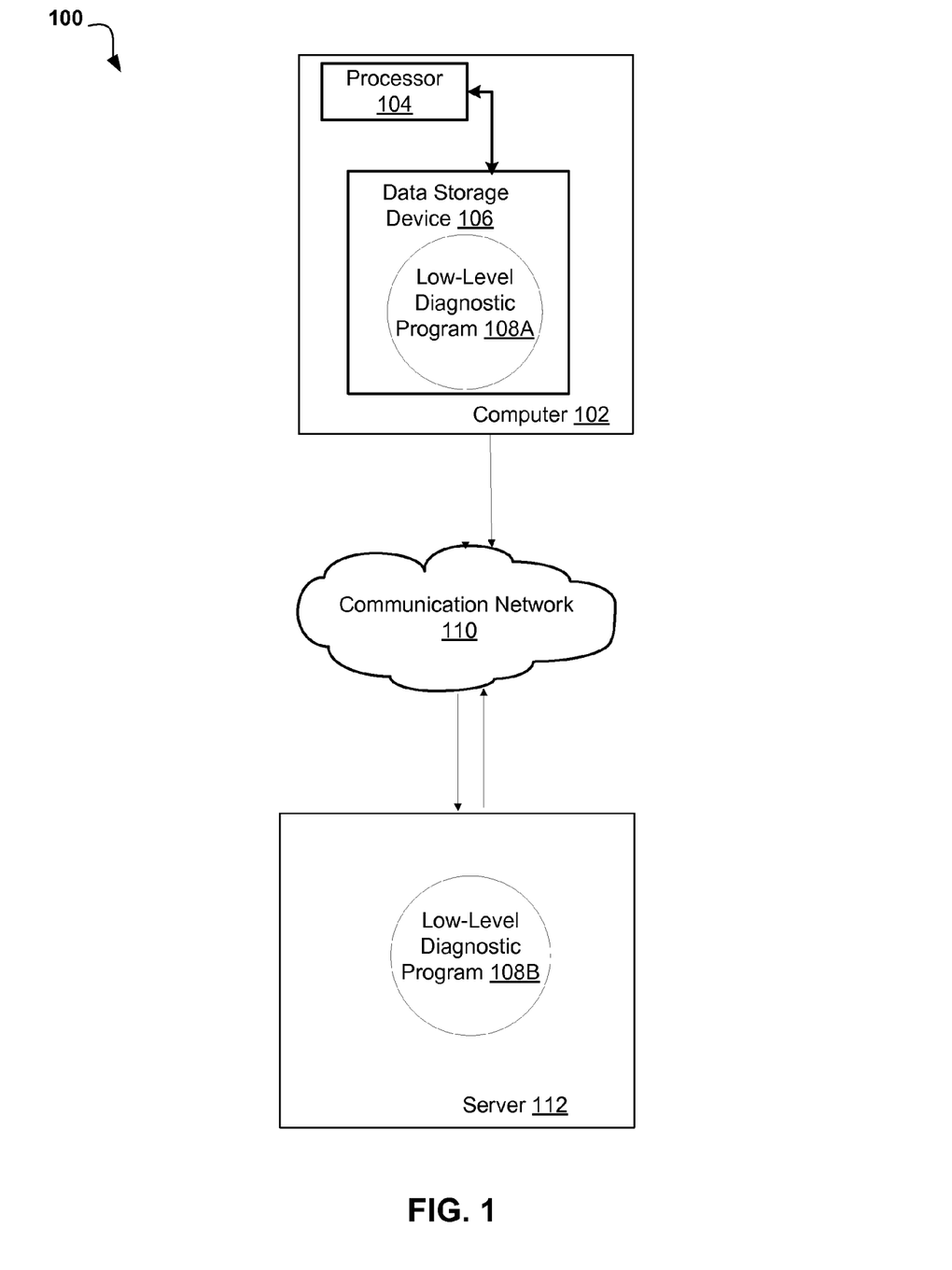
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a low-level diagnostic program 108A. The networked computer environment 100 may also include a server 112 that is enabled to run a low-level diagnostic program 108B and a communication network 110. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as low-level diagnostic program 108A, 108B may run on the client computer 102 or on the server computer 112. The low-level diagnostic program 108A, 108B may be executed to perform error detection that is context-dependent based upon the parameters of the context information being passed to called functions. For example, a user using a low-level diagnostic program 108A, running on a client computer 102 may connect via a communication network 110 to server computer 112 which may also be running a low-level diagnostic program 108B. Furthermore, the user using client computer 102 may also issue a successful input/output (I/O) request such as adding a file. Then, the user may receive an error message on client computer 102 when the user attempts to delete the same file that was just added. The error message may read that the "file is not found". The user knows that the file is there since a successful "add" of the file occurred; therefore, the user may then issue a diagnostic command with expected results (i.e. delete with expected results) from client computer 102. As such, client computer 102 would execute or run low-level-diagnostic program 108A to perform low-level diagnostics while the delete is being performed and capture the current system environment immediately following the error of the file not being found. The capturing of the current system environment may include requesting a storage dump, the recording of trace data, or the collection of problem documentation in retained memory. The method is explained in further detail below with respect to FIG. 2.

Figure 2:
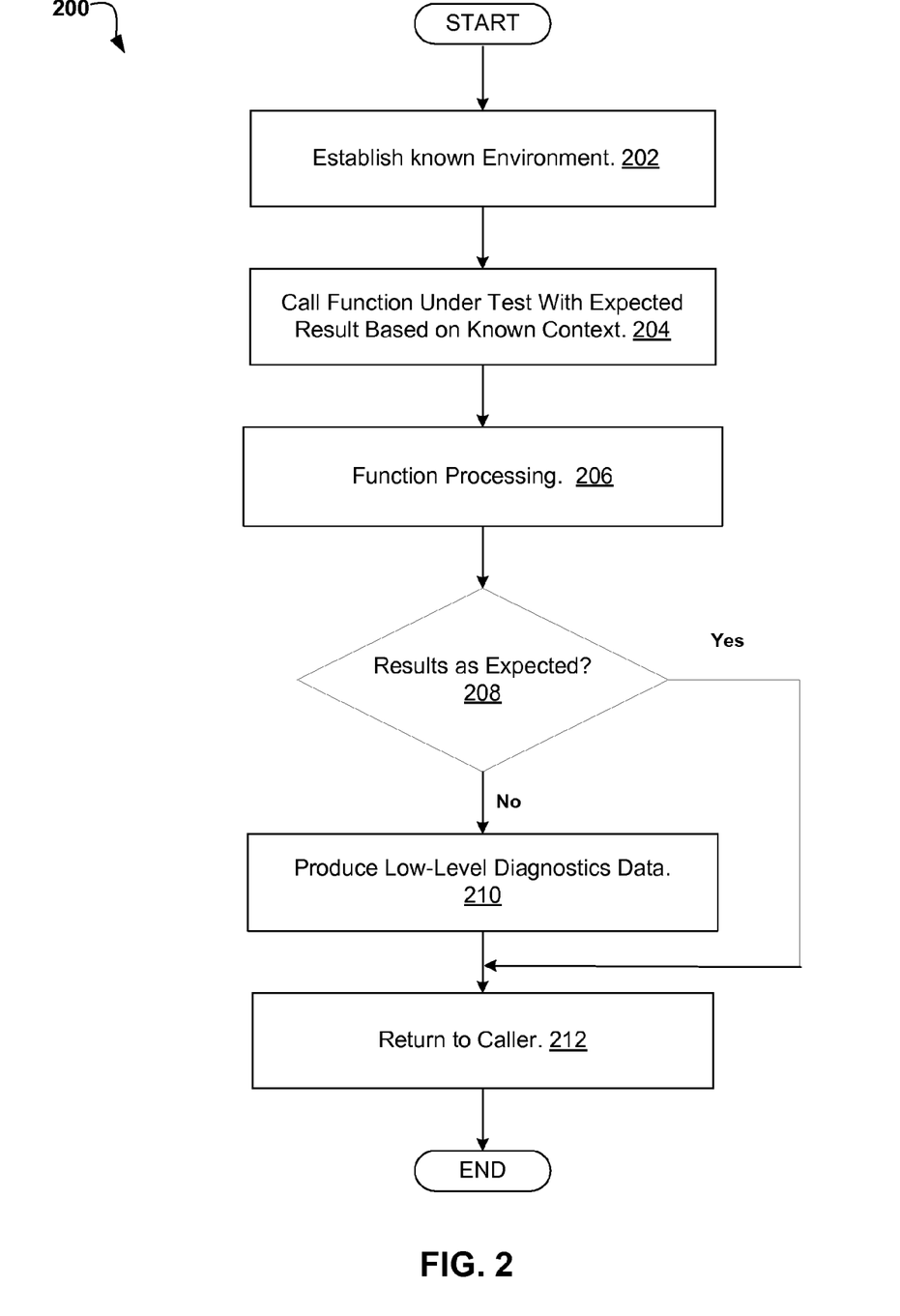
FIG. 2 is an operational flowchart illustrating the steps carried out by a low-level diagnostic program according to one embodiment.

Referring now to FIG. 2, an operational flowchart illustrating the steps carried out by low-level diagnostic program 108A (FIG. 1) and 108B (FIG. 1) in accordance with an embodiment of the present invention is depicted. For example, the embodiment may be implemented as a low-level diagnostic program 108A, 108B which may be running on client computer 102 (FIG. 1) or server computer 112 (FIG. 1) and provides low-level diagnostic testing that is based upon expected result parameters. The low-level diagnostic program 108A, 108B may, for example, be invoked by the tester via a graphical user interface (GUI) that allows the tester to select a function with diagnostic results (i.e. "Delete with diagnostics") rather than just having the option to perform the requested function without any diagnostics results (i.e. "Delete"). The error detection as performed by low-level diagnostic program 108A, 108B is explained in more detail below with respect to FIG. 2.

Referring to FIG. 2 at 202 the known system environment is established by the user. The tester may initialize the system environment so that the system environment is in a known state prior to the function under test case being performed. By initializing the system environment, the tester is creating the system environment in a known state so that the tester has the necessary contextual information prior to the function under testing. For example, the tester using client computer 102 or computer server 112 may want diagnostics to be performed on the "delete" function of a specific file that the user knows exists in the system. As such, to prepare the system environment for the function under test case, the tester using client computer 102 or computer server 112 may issue a "Delete" command of the specific file in the system to ensure that the file has been cleared from the system. Then the user may add the file back to the system so they know that the file definitely exists prior to the test case. As such, the environment is ready for the function under test of the "delete" function since the tester is certain that the specific file exists in the system since a successful "add" of the file has just been performed by the tester.

At 204, the call function under test with expected result based on known context is executed. With respect to the example above, the tester using client computer 102 or computer server 112 knows that the system environment has been initialized since the tester deleted and re-added the specific file back to the system environment. Next the tester using client computer 102 or server computer 112 may issue a command to direct low-level diagnostic program 108A, 108B to call a function under test with an expected result. One implementation may be via a graphical user interface in which the user is presented with the option of performing a "Delete with diagnostics" as opposed to a usual "Delete". The "Delete with diagnostics" may engage low-level diagnostic program 108A, 108B running on client computer 102 and server computer 112, respectively. Then low-level diagnostic program 108A, 108B may call the function under test (i.e. the "Delete" function) with an expected result. As such optional parameters may be assigned to the call function under test (i.e. the "delete" function) which will determine whether the function under test performs successfully with the expected result. For example, low level diagnostic program 108A, 108B may issue an optional parameter (i.e. "expected result parameter") along with the normal parameters when calling the function under test (i.e. "delete" function in this example). As such, the optional parameters are added to the invocation statement of functions in the call stack. An example of the invocation syntax may be:

FUNC1(parm1, parm2, . . . , expected_results);
CALL (FUNC1,parm1, parm2, . . . , expected_results)
FUNC1 parm1, parm2, . . . , expected_results
EXEC FUNC1 'parm1, parm2, . . . expected_results'
EXEC FUNC1 parm1(value1) parm2(value2) . . . expected_results(value)
CALL FUNC1,parm_list In the above example, parm list is a table of parameters: PARM1, PARM2 and expected results. The expected results parameter may be a simple or complex structure. It may include the name of the function whose output is to be checked (i.e., the function under test); output fields and values to check for (i.e., expected result values); the type of comparison to be made (between the expected result value and the actual result value), such as "equal to" or "not equal to", a set of conditions that are to be considered the error, a set of conditions wherein anything not in the set is to be considered the error, and an action to take in case of a match. The action to be taken may include capturing one or more storage areas associated with the current system environment. For example, one implementation may be for low-level diagnostic program 108A, 108B to check for specific actual result values returned from the function under test. The actual result values to check may include a single return value or error code; a list of return values or error codes; a single message code or message text; a list of message codes or message text; a single reason code; a list of reason codes; or combinations of any of these elements. Additionally, the action to be taken may include capturing one of more storage areas associated with the current system environment (i.e., a snapshot of the current system environment at the time the error occurred).

Then at 206, the function under test that was called is processed and executes the necessary code. The expected result parameter is passed to the function under test when the function under test is called. With respect to the previous example, the "Delete" function may be called and then this function would execute the necessary code to perform the operation along with the expected result parameter. For example, low-level diagnostic program 108A, 108B running a test case on client computer 102 or server computer 112, respectively may call the delete function with an expected return result of Zero. The syntax for such a command may be: IDCAMS to delete data set DSN1: DELETE 'DSN1' EXPECT(VSAM_FEEDBACK,00000000). Based upon the parameters of this command, an actual result value of zero would be considered normal. Any actual result value other than zero would be considered a non-expected result.

Referring now to 208, the function under test results are checked to verify that they are expected. For example, low-level diagnostic program 108A, 108B running a test case on client computer 102 or server computer 112, respectively will check the function under test results and verify that the actual result value (i.e., an actual result from the function under test) is consistent with the expected result value that was passed to the function under test at the time the function under test was called. With respect to the example above, low-level diagnostic program 108A, 108B running a test case on client computer 102 or server computer 112, respectively will check the function under test actual result value to verify that a result of zero is returned.

If the function under test actual result value is not the same as the expected result value, then at 210, low-level diagnostic data is obtained to assist in problem determination. With respect to the "Delete" example above, low-level diagnostic program 108A, 108B running a test case on client computer 102 or server computer 112, respectively may call the delete function under test with an expected result value of zero and if an actual result value other than a zero is returned, then a system dump may be obtained. The syntax for such a command may be: IDCAMS to delete data set DSN1: DELETE 'DSN1'EXPECT(VSAM_FEEDBACK,00000000)CONDITION(UNEQUAL) ACTION(DUMP). In this example, if a non-zero actual result value is to be returned, then the system will take a storage dump.

In the example described above, a user may encounter a problem such that data sets that are in fact present are not found when the user attempts to delete them. As such, in the command referenced above, IDCAMS calls CATALOG to delete DSN1 with a parameter list including the information that for this request only, if the VSAM actual result value is not zero, it is an error and a storage dump should be requested. CATALOG calls VSAM to find the appropriate record in the Catalog with an appendage to the parameter list indicating a dump should be taken in case of a non-zero actual result value. If VSAM moves a non-zero code to the actual result value for this request, it will request a dump.

In this case the expected result parameter is necessary because ordinarily VSAM and CATALOG consider a "No Record Found" to be a normal condition or user error and return to the user with an informational code without requesting any problem documentation. By the time the user is notified, the system state has changed too much for successful problem diagnosis.

As previously described, a storage dump captures the current system environment at the very moment a dump is initiated. Therefore, the current system environment is essentially frozen and may be recorded to aid in problem determination. As described above, there are some existing methods of obtaining a dump on a certain error code. However, the dump normally applies to all requests by all jobs and as such, may limit their usefulness. In particular, they are not usable when success or failure of a test depends on previous processing or the context of a function request. Furthermore, these methods often allow only one error code check to be active at a time and may impact system performance by freezing the system while every dump is recorded. In one implementation of the present embodiment, a dump may be recorded when an expected result is not returned from the test function. Unlike, the current methods described, the present invention only performs a dump when the expected result is not returned, therefore having less impact on system performance. However, capturing the current system environment at the time the non-expected result is returned, may aid in problem determination and diagnostics. In one implementation, the diagnostic report or system dump may be recorded in a file or a log which may be accessed by the caller. Then At 212, a return value (i.e., return statement) is returned to the caller. As such, the function under test returns the return value back to the function that called the function under test to execute (i.e., the return address). With respect to the example above, if the result was not expected, the caller may receive a notification that the "file was not found" or a return value of "9999". Then, the dump recording may be accessed to aid in problem determination since the current system environment at the time the error was encountered has been preserved.

In addition to low-level diagnostics program 108A, 108B requesting a storage dump, another implementation may be to include the recording of trace data. The storage areas that are to be included in the dump or trace may be part of the action specification (i.e., the expected result parameters).

At 208, if low-level diagnostic program 108A, 108B determines that the actual result values from the previously called function under test were expected, then at 212, the return value is returned to the caller. With respect to the example above, the caller may receive a successful command notification, such as the "Delete" was successful or a return value of zero.

Figure 3:
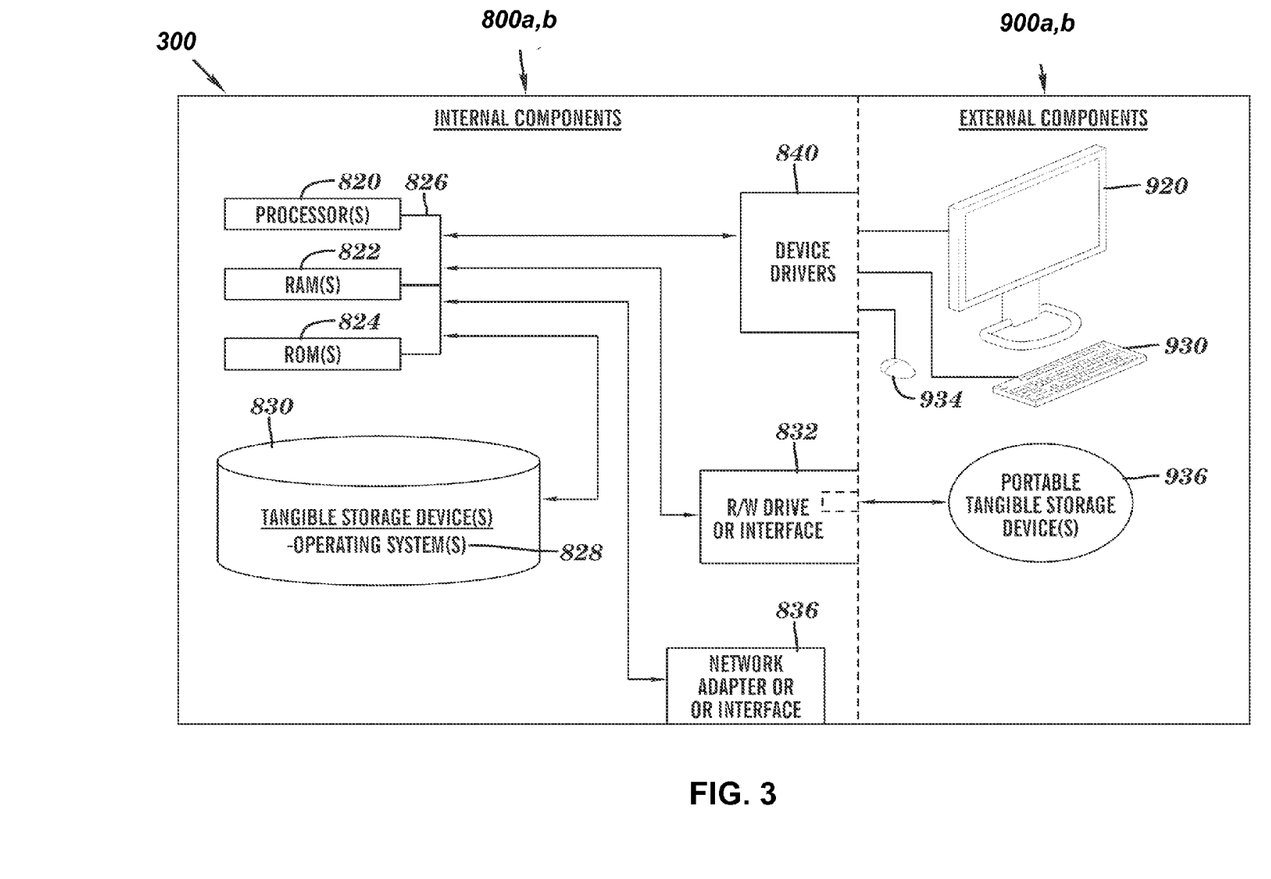
FIG. 3 is a block diagram of internal and external components of computers and servers depicted in FIG. 1.

FIG. 3 is a block diagram of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server computer 112 (FIG. 1) include respective sets of internal components 800a, b and external components 900a, b illustrated in FIG. 3. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and program 108A, 108B (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The low-level diagnostic program 108A, 108B can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless wi-fi interface cards, or 3G or 4G wireless interface cards or other wired or wireless communication links. The low-level diagnostic program 108 in client computer 102 and low-level diagnostic program 108B in network server 112 can be downloaded to client computer 102 from an external computer via a network (for example, the Internet, a local area network or other, wide area network) and respective network adapters or interfaces 836. From the network adapters or interfaces 836, the low-level diagnostic program 108A in client computer 102; low-level diagnostic program 108B in network server computer 112 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A processor-implemented method for diagnostic testing using an expected result parameter, the method comprising:
    establishing, by a processor, a known system environment associated with a specific function under test;
    setting, by the processor, an expected result parameter corresponding to the specific function under test and the known system environment;
    issuing, by the processor, a call to execute the specific function under test, wherein the specific function under test is called by a higher-level module and the specific function under test is a lower-level module than the higher level module that called the specific function under test and the expected result parameter is passed through multiple levels of nesting modules and assigned to the specific function under test when the specific function under test is called, wherein the expected result parameter is an added parameter to an invocation statement of a function in a call stack;
    comparing, by the specific function under test, the assigned expected result value to an actual result value;
    determining, by the specific function under test, an error based on the actual result value being different from the assigned expected result value;
    performing, by the specific function under test, a low-level diagnostic based on the determined error, wherein the performing of the low-level diagnostic comprises a capturing of a current system environment immediately following the error which includes performing a storage dump, recording a plurality of trace data, and collecting a plurality of problem documentation in retained memory; and
    receiving, by the processor, a return value from the specific function under test based on the issued call.

2. The method of claim 1, wherein the expected result parameter is added to the call to execute the function under test.

3. The method of claim 1, wherein the expected result parameter includes at least one of a name of the function under test, the expected result value to be checked against the actual result value, a type of comparison, a set of conditions that are to be considered the error, a set of conditions wherein anything not in the set is to be considered the error, and an action to be taken when the error occurs.

4. The method of claim 3, wherein the actual result value comprises at least one of the return value, an error code, a message code, a message text, and a reason code.

5. The method of claim 3, wherein the comparison includes "equal to" or "not equal to".

6. The method of claim 3, wherein the action to be taken includes capturing one of more storage areas associated with a current system environment.

7. A computer system for diagnostic testing using an expected result parameter, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
        program instructions to establish a known system environment associated with a specific function under test;
        program instructions to set an expected result parameter corresponding to the specific function under test and the known system environment;
        program instructions to issue a call to execute the specific function under test, wherein the specific function under test is called by a higher-level module and the specific function under test is a lower-level module than the higher level module that called the specific function under test and the expected result parameter is passed through multiple levels of nesting modules and assigned to the specific function under test when the specific function under test is called, wherein the expected result parameter is an added parameter to an invocation statement of a function in a call stack;
        program instructions to compare an expected result value to the assigned actual result value;
        program instructions to determine an error based on the assigned actual result value being different from the expected result value;
        program instructions to perform a low-level diagnostic based on the determined error wherein the performing of the low-level diagnostic comprises a capturing of a current system environment immediately following the error which includes performing a storage dump, recording a plurality of trace data, and collecting a plurality of problem documentation in retained memory; and
        program instructions to receive a return value from the specific function under test based on the issued call.

8. The computer system of claim 7, wherein the expected result parameter is added to the call to execute the function under test.

9. The computer system of claim 7, wherein the expected result parameter includes a name of the function under test, the expected result value to be checked against the actual result value, a type of comparison, a set of conditions that are to be considered the error, a set of conditions wherein anything not in the set is to be considered the error, and an action to be taken when the error occurs.

10. The computer system of claim 9, wherein the actual result value comprises at least one of the return value, an error code, a message code, a message text, and a reason code.

11. A computer program product for diagnostic testing using an expected result parameter, the computer program product comprising:
    one or more computer-readable storage devices and program instructions stored on at least one of the one or more non-transitory tangible storage devices, the program instructions comprising:

program instructions to establish a known system environment associated with a specific function under test;
program instructions to set an expected result parameter corresponding to the specific function under test and the known system environment;
program instructions to issue a call to execute the specific function under test, wherein the specific function under test is called by a higher-level module and the specific function under test is a lower-level module than the higher level module that called the specific function under test and the expected result parameter is passed through multiple levels of nesting modules and assigned to the specific function under test when the specific function under test is called, wherein the expected result parameter is an added parameter to an invocation statement of a function in a call stack;
program instructions to compare an expected result value to the assigned actual result value;
program instructions to determine an error based on the assigned actual result value being different from the expected result value;
program instructions to perform a low-level diagnostic based on the determined error wherein the performing of the low-level diagnostic comprises a capturing of a current system environment immediately following the error which includes performing a storage dump, recording a plurality of trace data, and collecting a plurality of problem documentation in retained memory; and
program instructions to receive a return value from the function under test based on the issued call.

12. The computer program product of claim 11, wherein the expected result parameter is added to the call to execute the function under test.

13. The computer program product of claim 11, wherein the expected result value includes a name of the function under test, the expected result value to be checked against the actual result value, a type of comparison, a set of conditions that are to be considered the error, a set of conditions wherein anything not in the set is to be considered the error, and an action to be taken when the error occurs.

14. The computer program product of claim 13, wherein the actual result value comprises at least one of the return value, an error code, a message code, a message text, and a reason code.

* * * * *